(12) United States Patent
Barron

(10) Patent No.: US 10,961,034 B2
(45) Date of Patent: Mar. 30, 2021

(54) OUTLET CONNECTOR PIECE HAVING A PROTRUDING FLANGE

(71) Applicant: Robert Bosch GmbH, Stuttgart (DE)

(72) Inventor: Dan Barron, Schaffhausen (CH)

(73) Assignee: SYNTEGON POUCH SYSTEMS AG, Beringen (CH)

( * ) Notice: Subject to any disclaimer, the term of this patent is extended or adjusted under 35 U.S.C. 154(b) by 17 days.

(21) Appl. No.: 15/753,626

(22) PCT Filed: Jul. 5, 2016

(86) PCT No.: PCT/EP2016/065802
§ 371 (c)(1),
(2) Date: Feb. 20, 2018

(87) PCT Pub. No.: WO2017/029014
PCT Pub. Date: Feb. 23, 2017

(65) Prior Publication Data
US 2020/0207531 A1    Jul. 2, 2020

(30) Foreign Application Priority Data
Aug. 20, 2015 (DE) .................. 10 2015 215 864.0

(51) Int. Cl.
*B65D 75/58* (2006.01)
*B29C 65/00* (2006.01)
(Continued)

(52) U.S. Cl.
CPC ..... *B65D 75/5877* (2013.01); *B65D 75/5883* (2013.01); *B29C 66/71* (2013.01);
(Continued)

(58) Field of Classification Search
CPC ................. B65D 75/5877; B65D 75/5833
See application file for complete search history.

(56) References Cited

U.S. PATENT DOCUMENTS

| 6,343,724 B1* | 2/2002 | Ophardt | A47K 5/1202 |
|---|---|---|---|
| | | | 137/543.23 |
| 2011/0062192 A1 | 3/2011 | Gruber | |
| 2015/0056063 A1* | 2/2015 | Barron | F04C 2/126 |
| | | | 415/60 |

FOREIGN PATENT DOCUMENTS

| BE | 451380 | 8/1943 |
|---|---|---|
| CN | 1318499 A | 10/2001 |

(Continued)

OTHER PUBLICATIONS

Machine Translation of JP-10236491. Espacenet retrived from www.epo.org.*

(Continued)

*Primary Examiner* — Jeremy Carroll
(74) *Attorney, Agent, or Firm* — Michael Best & Friedrich LLP

(57) ABSTRACT

The invention relates to an outlet connector piece (1) having a protruding flange (3) for non-detachably securing said outlet connector piece to a tubular bag (12). The flange (3) has a contact surface (4) which is designed for a welding or adhesive connection to the tubular bag and surrounds an outlet connector piece passage along a circumference (6). The contact surface (4) is rectangular or square, and the flange (3) has, extending parallel in a direction of extension, a film hinge (7) on each side at a distance from said outlet connector piece passage.

3 Claims, 3 Drawing Sheets

(51) Int. Cl.
*B65D 33/02* (2006.01)
*B65D 75/00* (2006.01)

(52) U.S. Cl.
CPC ............ *B65D 33/02* (2013.01); *B65D 75/008* (2013.01); *B65D 2575/586* (2013.01)

(56) References Cited

FOREIGN PATENT DOCUMENTS

| | | | | |
|---|---|---|---|---|
| CN | 103492276 A | 1/2014 | | |
| DE | 19942035 | 3/2001 | | |
| EP | 0414992 | 3/1991 | | |
| JP | 10236491 | 9/1998 | | |
| JP | 10236491 A | * | 9/1998 | ......... B65D 75/5877 |
| JP | 3247068 B2 | 1/2002 | | |
| WO | WO-2013149750 A1 | * | 10/2013 | .............. F04C 2/126 |
| WO | 2015058933 | 4/2015 | | |

OTHER PUBLICATIONS

International Search Report for Application No. PCT/EP2016/065802 dated Sep. 19, 2016 (English Translation, 2 pages).

* cited by examiner

OUTLET CONNECTOR PIECE HAVING A PROTRUDING FLANGE

BACKGROUND OF THE INVENTION

The invention relates to an outlet connector piece having a protruding flange for non-detachably securing to a tubular bag by means of welding or adhesive bonding.

In the food supply area, very large amounts of viscous products have, for example, to be delivered today in so-called tubular bags for the purpose of maintaining hygienic conditions. These tubular bags are flexible containers made from plastic in which a dispensing device, for example in the form of a metering pump, can also often be mounted to an outlet connector piece and which in the total are provided for single use for hygienic reasons.

Outlet connector pieces of the kind described here are mostly fitted to the tubular bag first after the production of the same. This is generally done by welding or adhesive bonding the protruding flange to the flexible material of the tubular bag. The tubular bag itself remains however intact during this process at the attachment point and said tubular bag also remains intact up to the effective removal or respectively emptying of the tubular bag.

The problem is effectively the quality of the material connection or respectively the tear-resistance of the welded or adhesively bonded flange. Situations, in which the tear-resistance of the flange is put to the test, do not only occur during transport, storage and handling of the filled tubular bags but also during the emptying process itself. Differences are that, in the former case, the tubular bags are still intact in the outlet connector region. This is, however, not true in the latter case because the flexible material of the tubular bags is first penetrated in the outlet connector region for the purpose of emptying said tubular bag. In the event that leakages occur at the welding or adhesive bonding point as a result of quality defects or as a result of deficient tear-resistance during the emptying process, the danger of contamination of the contents of the tubular bag, of course, exists. Slow emptying processes are probably more greatly endangered than fast emptying processes.

As mentioned, the emptying process itself can put the tear-resistance of the outlet connector piece to the test. Besides emptying purely by the force of gravity, pump and/or power assisted emptying aides are increasingly used. In this regard, metering pumps can be used, which suction the contents of the tubular bags completely empty or mechanical or auxiliary equipment can be provided to press out the contents of the tubular bags. Creases in the tubular bags resulting during the suction process or deformations resulting during the pressing out process can, however, have the effect that the flange of the outlet connector piece that is welded or adhesively bonded is at least partially peeled away in the edge regions from the tubular bag. Precisely the edge regions of the flange are, of course, most greatly endangered because the peeling forces are the greatest there. In the drawings belonging to the exemplary embodiment of the invention (see FIG. 5 in this regard), this effect is even illustrated.

In the field, this relates to a problem known per se in a transition zone, which is further exacerbated because the outlet connector piece itself has to remain firm and dimensionally stable whereas the tubular bag itself is, however, advertently thin and elastic.

The present invention, which is particularly well suited for use with standard tubular bags, is, however, not limited to these. Rectangular tubular bags are substantially understood by standard tubular bags, the production and filling of which is relatively simple and also well known. Said tubular bags can therefore also be used on a large scale. In the case of such tubular bags, the outlet connector piece is mounted on one of the edges, frequently at the lower edge, because it is desirable that the outlet connector piece is located at the lowest point when the standard tubular bag is inserted in the use position into a dispensing device, in order to achieve the best possible emptying capability. An example of this can be substantially extracted from the WIPO patent application WO2015058933A1.

The American patent application US-2011/0062192 demonstrates a solution, in which the attempt is made to improve the tear-resistance of the connection between the outlet connector piece and the flexible film material of the tubular bag by means of an interface that is molded onto the outlet connector piece and has a special shape. The shape shown appears substantially cap-like and provides (in comparison to the dimension of the outlet connector piece) relatively large lateral connection surfaces. Flexible appendages can likewise be seen, which are mounted on the cap-like shape and are used to distribute the forces occurring. The latter are referred to as SDFs (stress delocalization features). The relative complex shape and the relatively complicated type of attachment to the tubular bag appear to be disadvantageous.

The European patent application EP-0414992 demonstrates a further solution for film containers. In the case of said film containers, a plug part of the outlet connector piece is made from dimensionally stable material; however, a flange part that is connected to the plug part is made from a flexible and weldable plastic. It appears to be disadvantageous here that the pouring nozzle as a whole has a plurality of pieces, i.e. consists of different types of plastic and therefore is expensive to manufacture, and that the actual connection surface is relatively small between the outlet connector piece and the flexible film material of the tubular bag, and therefore it can be assumed that the tear-resistance is possibly insufficient.

SUMMARY OF THE INVENTION

It is therefore the aim of the invention to specify an outlet connector piece which has an improved tear-resistance besides a simpler manufacturability and a simpler attachability.

The aim includes substantially that the flange part has film hinges.

The advantages consist of inter alia that the peeling or stripping off effect (tearing open of the welding or adhesive connection between the outlet connector piece and the flexible film material of the tubular bag) can be greatly reduced at the edge points. Therefore, tubular bags designed in such a manner are also substantially better suited to dispensing and metering devices, in which the complete emptying is further additionally supported by mechanical auxiliary devices, therefore, e.g., pressing-out aides.

BRIEF DESCRIPTION OF THE DRAWINGS

An embodiment of the present invention will subsequently be described in greater detail with the aid of the drawings. In the drawings.

DETAILED DESCRIPTION

Figure 1:
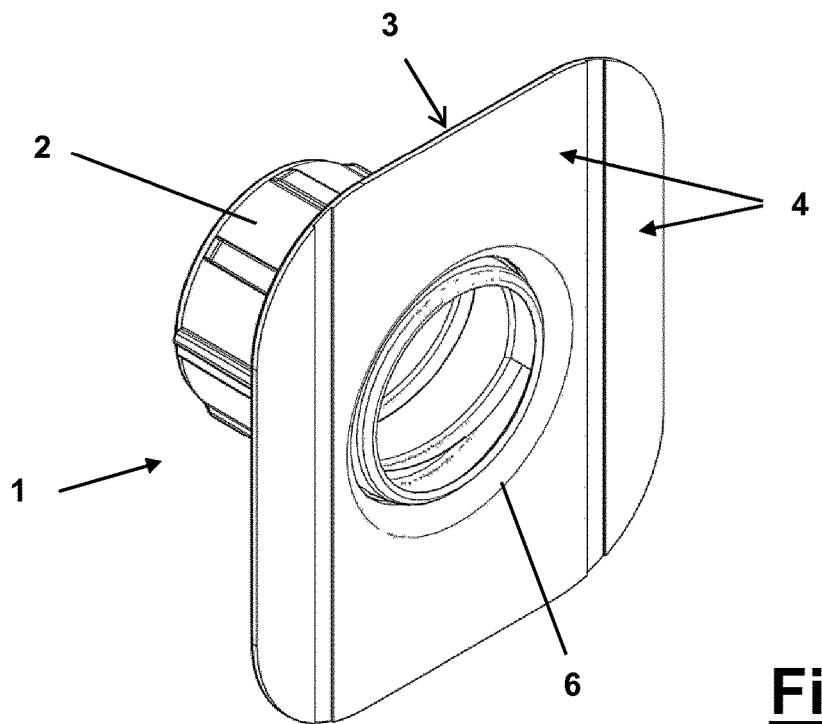
FIG. 1 shows a spatial view of an outlet connector piece according to the invention.

FIG. 1 shows a spatial view of an outlet connector piece 1 according to the invention. The outlet connector piece 1 has a cylindrical outlet part 2 having an internal thread and a protruding flange 3 for the non-detachable attachment to a tubular bag [see FIGS. 3, 6, 7]. The flange 3 has a contact surface 4 which is provided for a welding or adhesive connection to the tubular bag and which completely surrounds an outlet connector piece passage 5 in the outlet part 2 along a circular circumference 6. In the present exemplary embodiment, the outlet connector piece passage 5 is circular cylindrical, it could, however, just as well also be formed differently, for example square. The contact surface 4 is here in accordance with the shape of the flange 3, rectangular or square, and has a sufficient size in order to ensure a reliable welding or adhesive connection to the tubular bag. In principle, other shapes, for example oval, could, however, also be provided. Furthermore, the flange 3 has, extending parallel in a direction of extension, a film hinge 7 on each side at a distance from said outlet connector piece passage. The latter feature is useful on account of the intended attachment on the edge of a substantially rectangular standard tubular bag because bending points running largely parallel to the edge of the tubular bag are then also to be expected. This fact can also be seen from the FIGS. 5-7.

Figure 2:
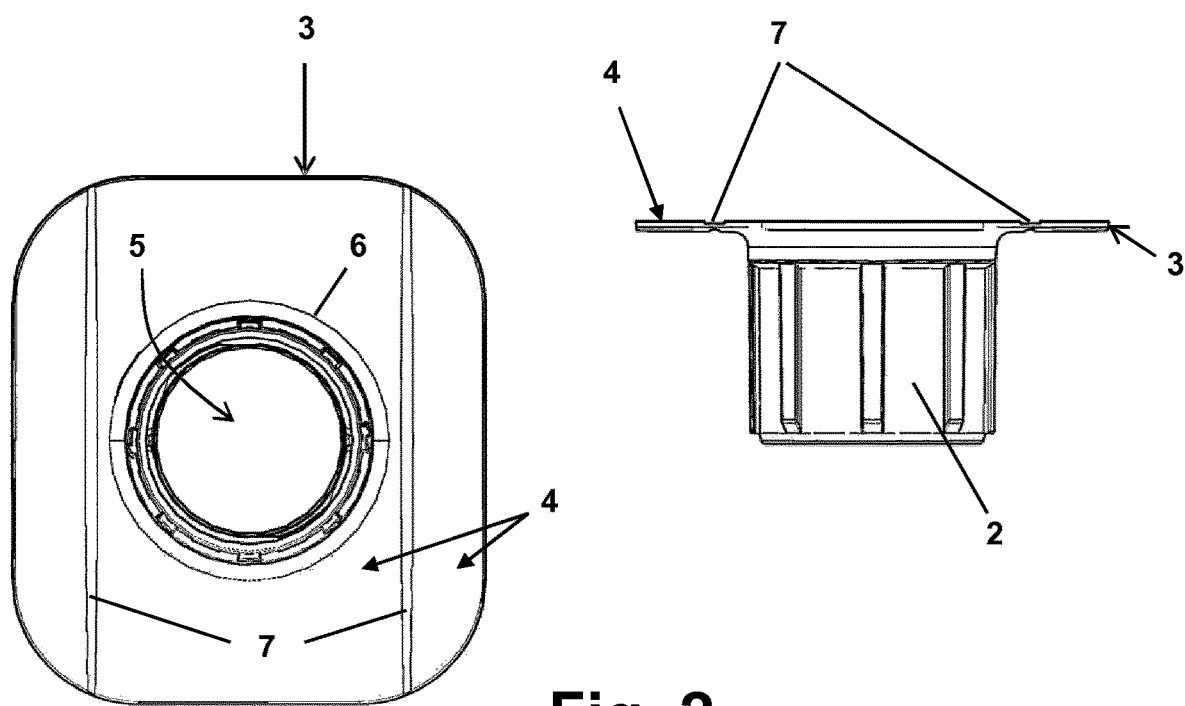
FIG. 2 shows the outlet connector piece from FIG. 1 in a view from below and from the side.

FIG. 2 shows the outlet connector piece from FIG. 1 in a view from below and from the side.

Finally, the FIGS. 1 and 2 show that the contact surface 4 projects on all sides beyond the circumference 6 by at least the radius of the same. Furthermore, it can also be seen that the film hinges 7 are arranged closer to the circumference 6 than to an outer edge of the contact surface 4. In addition, the outlet connector piece 1 shown is one piece and made of plastic.

Figure 3:
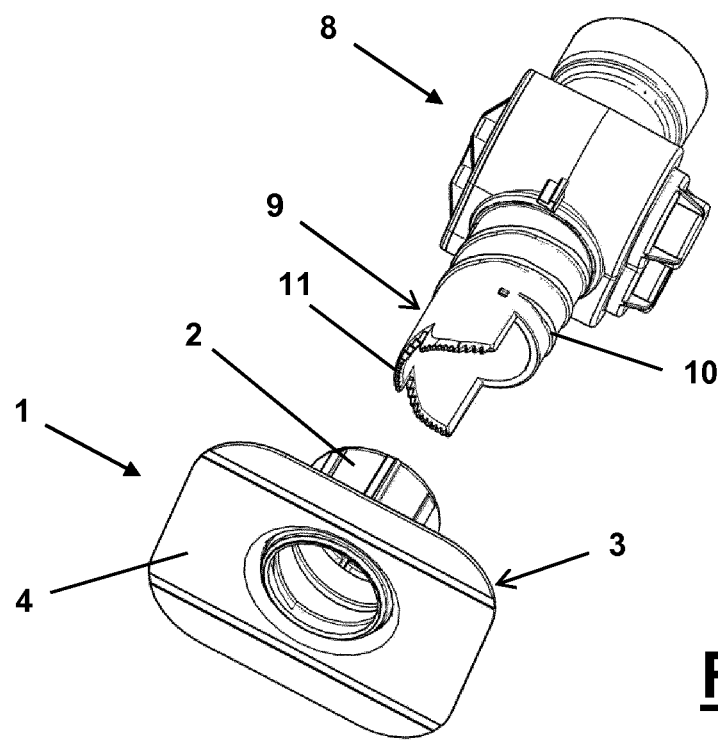
FIG. 3 shows the outlet connector piece from FIG. 1 and a disposable pump that can be mounted on the outlet connector piece prior to assembly.

FIG. 3 shows the outlet connector piece 1 from FIG. 1 and a disposable metering pump 8, which can be mounted sealingly on the outlet connector piece 1, prior to assembly. An external thread 10 applied to a screw-in part 9 or the disposable metering pump fits to the internal thread of the outlet part 2 that was already mentioned earlier. In addition, the screw-in part 9 of the disposable metering pump 8 is provided with a cutting device 11. When screwing the screw-in part 9 into the outlet part 2 on the tubular bag, the flexible film material of the tubular bag is advertently pierced or cut through at this point in the outlet part. In this way, a tubular bag equipped with an outlet connector piece according to the invention can be opened or respectively tapped into.

Figure 4:
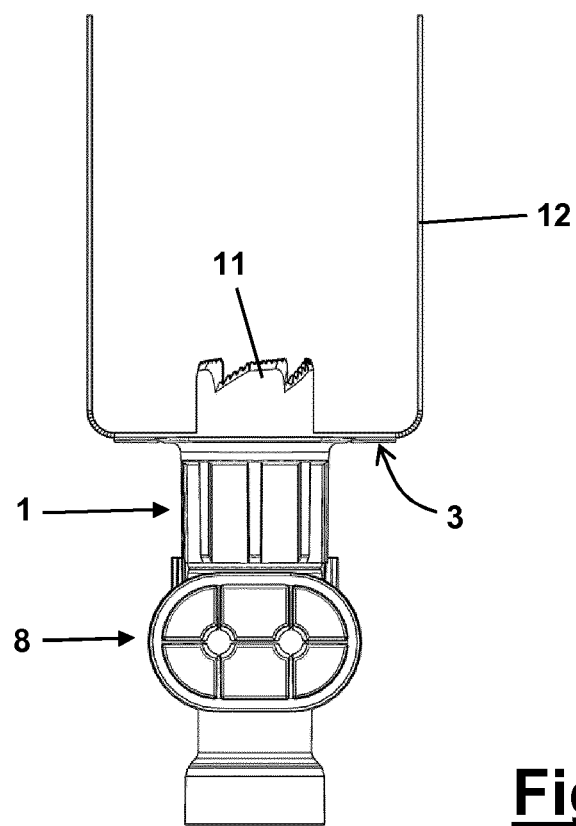
FIG. 4 shows the outlet connector piece from FIG. 1 on a tubular bag with a mounted disposable pump from FIG. 3.

FIG. 4 shows the outlet connector piece 1 from FIG. 1 on a tubular bag 12 with the screwed-in or respectively mounted disposable metering pump from FIG. 3. It can be clearly seen here that the cutting device 11 now protrudes into the interior of the tubular bag 12, of which here only a lower portion is shown in cross-section. In this depiction, the tubular bag 12 is open for the dispensing of the contents. It likewise can be seen from this depiction that the outlet connector piece 1 is mounted on the lower edge of the tubular bag 12. As expected, the flexible film material of the tubular bag 12 follows the shape or respectively the contour of the flange 3 just in the region of the contact surface 4 because said flexible film material is non-detachably connected to said flange.

The following embodiments are used to illustrate the development respectively the prevention of the aforementioned peeling effect. By the peeling or stripping away effect, the possible tearing open of the welding or adhesive connection between the outlet connector piece and the flexible film material of the tubular bag at the edge points of the flange is understood, i.e. at points at which actually the non-detachable connection that is in principle provided should be present.

Figure 5:
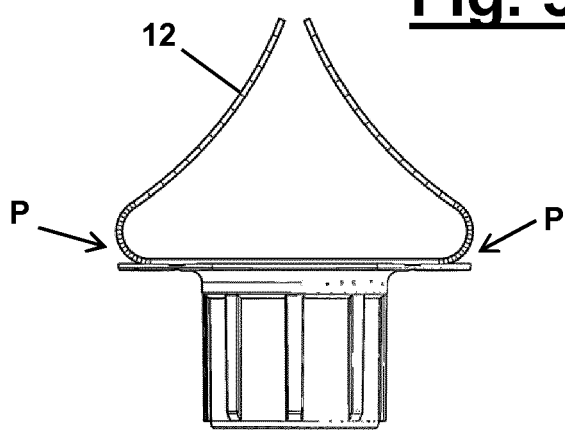
FIG. 5 shows an outlet connector piece without the inventive features in order to illustrate the peeling effect.

FIG. 5 shows an outlet connector piece without the inventive features. The peeling effect P is shown at points denoted with pointer arrows.

Creases on the tubular bag that develop during the suctioning process or deformations that develop during the pressing-out process may, however have the effect that the flange of the outlet connector piece, which is welded or adhesively bonded to the tubular bag and has a much greater stiffness than the flexible film material of the tubular bag, at least partially peels away from the tubular bag in the edge regions. Precisely the edge regions of the flange are most greatly endangered because the peeling forces are the greatest there and also act in unfavorable directions. Undesirable leakages in the flange region can be the result.

Figure 6:
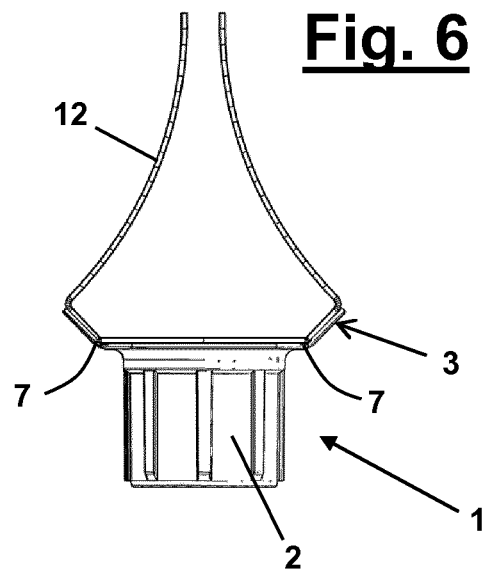
FIG. 6 shows the outlet connector piece from FIG. 1 in order to illustrate the prevention of the peeling effect.

FIG. 6 shows, in a comparable situation as in FIG. 5, the outlet connector piece from FIG. 1 to illustrate the inventive prevention of the peeling effect. In contrast to the continuously rigid flange of the conventional solution according to FIG. 5, outer regions of the contact surface 4 can, due to the film hinges 7, largely withstand the movements of the flexible film material of the tubular bag which trigger the peeling process. The outer regions of the contact surface 4 thus adhere longer to the tubular bag. Hence, the peeling or stripping off effect is greatly reduced here and leakages in the flange region can be very effectively prevented.

Figure 7:
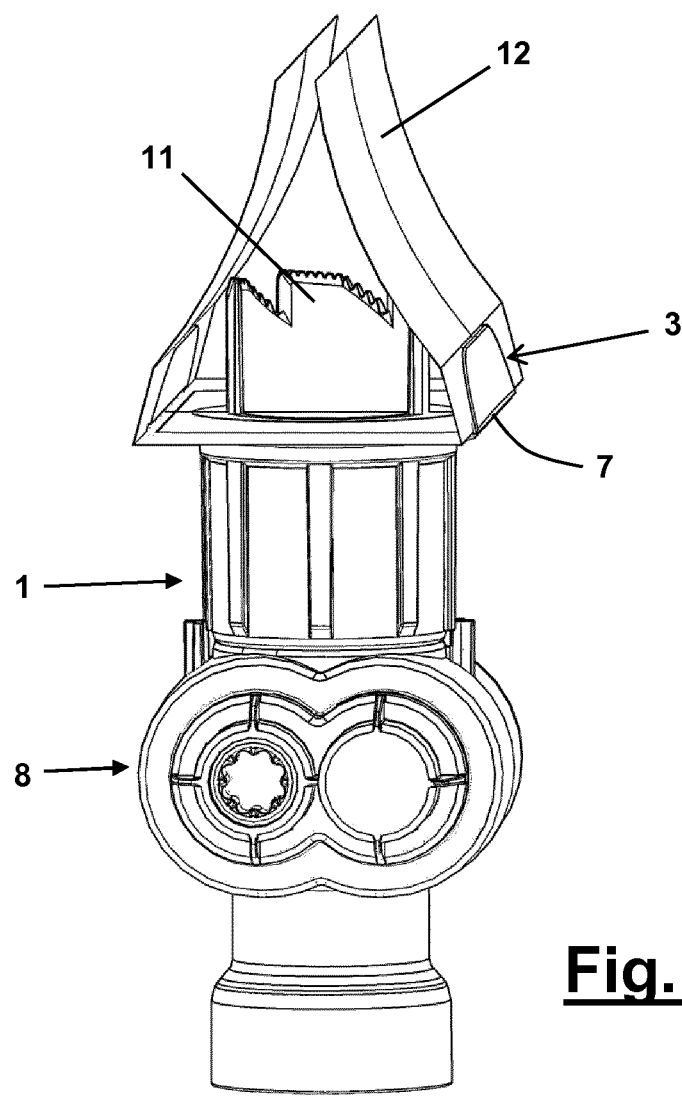
FIG. 7 shows the outlet connector piece from FIG. 1 on a tubular bag with a mounted disposable pump from FIG. 3 in order to further illustrate the prevention of the peeling effect.

Finally, FIG. 7 shows the outlet connector piece from FIG. 1 on a tubular bag having a mounted disposable pump from FIG. 3 in order to illustrate the prevention of the peeling effect. The situation is, however, comparable to that of FIG. 6. In addition, a further advantageous effect of the film hinges 7 can be further pointed out here. The invention can obviously also contribute to the fact that, during the suctioning process, collapsing flexible film material of the tubular bag does not close the outlet connector piece passage and thus the complete emptying of the tubular bag is not impeded.

In any case, it can also be seen here that, due to the hinge effect of the film hinges 7, edge regions of the contact surface 3 are foldable or can also be folded over about a hinge angle greater than 90° to the tubular bag 12.

REFERENCE NUMBER LIST

1 outlet connector piece
2 outlet part
3 flange
4 contact surface
5 outlet connector piece passage 6 circumference
7 film hinge
8 disposable metering pump
9 screw-in part
10 external thread
11 cutting device
12 tubular bag
P peeling effect

What is claimed is:

1. An outlet connector piece (1) having a protruding flange (3) for non-detachably securing said outlet connector piece (1) on a tubular bag (12), wherein, the outlet connector piece (1) is configured to receive a screwable disposable metering pump (8) having a cutting device (11) for the tubular bag (12), wherein the flange (3) has a contact surface (4) which is configured for a welding or adhesive connection to the tubular bag (12) and surrounds an outlet connector piece passage (5) along a circumference (6) of the outlet connector piece passage (5), characterized in that the flange (3) has a film hinge (7) on each opposing side of the outlet connector piece passage (5), the film hinges (7) extending parallel to each other in a direction of extension and being arranged closer to the circumference (6) than an outer edge of the contact surface (4).

2. A bag assembly including the tubular bag (12) and the outlet connector piece (1) according to claim 1, characterized in that the contact surface (4) projects beyond the circumference (6) on all sides by at least a radius of the circumference (6).

3. A bag assembly including the tubular bag (12) and the outlet connector piece according to claim 1, characterized in that edge regions of the contact surface (4) are configured to be folded by a hinge angle greater than 90° to the tubular bag (12) due to a hinge effect of the film hinges (7).

* * * * *